Figure 2:
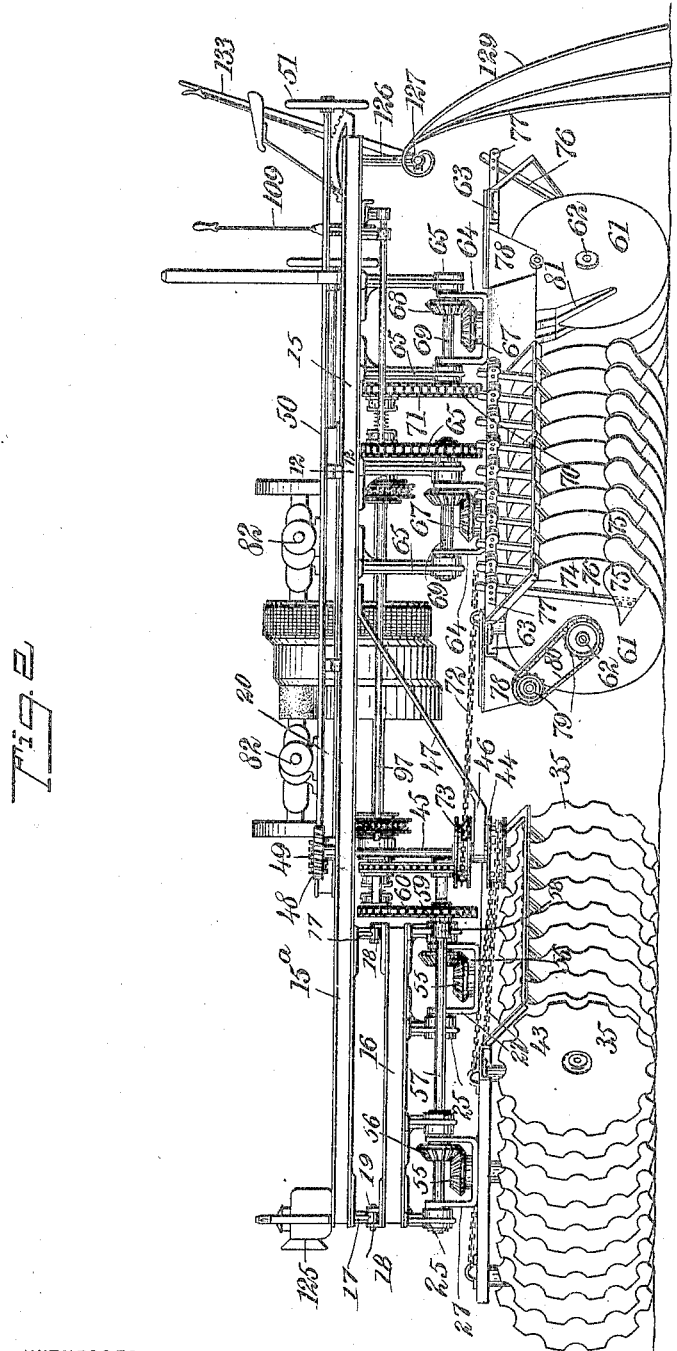

No. 789,528. PATENTED MAY 9, 1905.
A. E. COOK & S. E. KURTZ.
MOTOR DRIVEN AGRICULTURAL APPARATUS.
APPLICATION FILED FEB. 4, 1904.

6 SHEETS—SHEET 1.

*Fig. 1*

WITNESSES:
J. S. Brophy
Isaac B. Owens

INVENTORS
Albert E. Cook
Samuel E. Kurtz
BY
Munn
ATTORNEYS

No. 789,528. PATENTED MAY 9, 1905.
A. E. COOK & S. E. KURTZ.
MOTOR DRIVEN AGRICULTURAL APPARATUS.
APPLICATION FILED FEB. 4, 1904.

6 SHEETS—SHEET 2.

WITNESSES:
J. A. Brophy
Isaac B. Owens

INVENTORS
Albert E. Cook
Samuel E. Kurtz
BY
ATTORNEYS

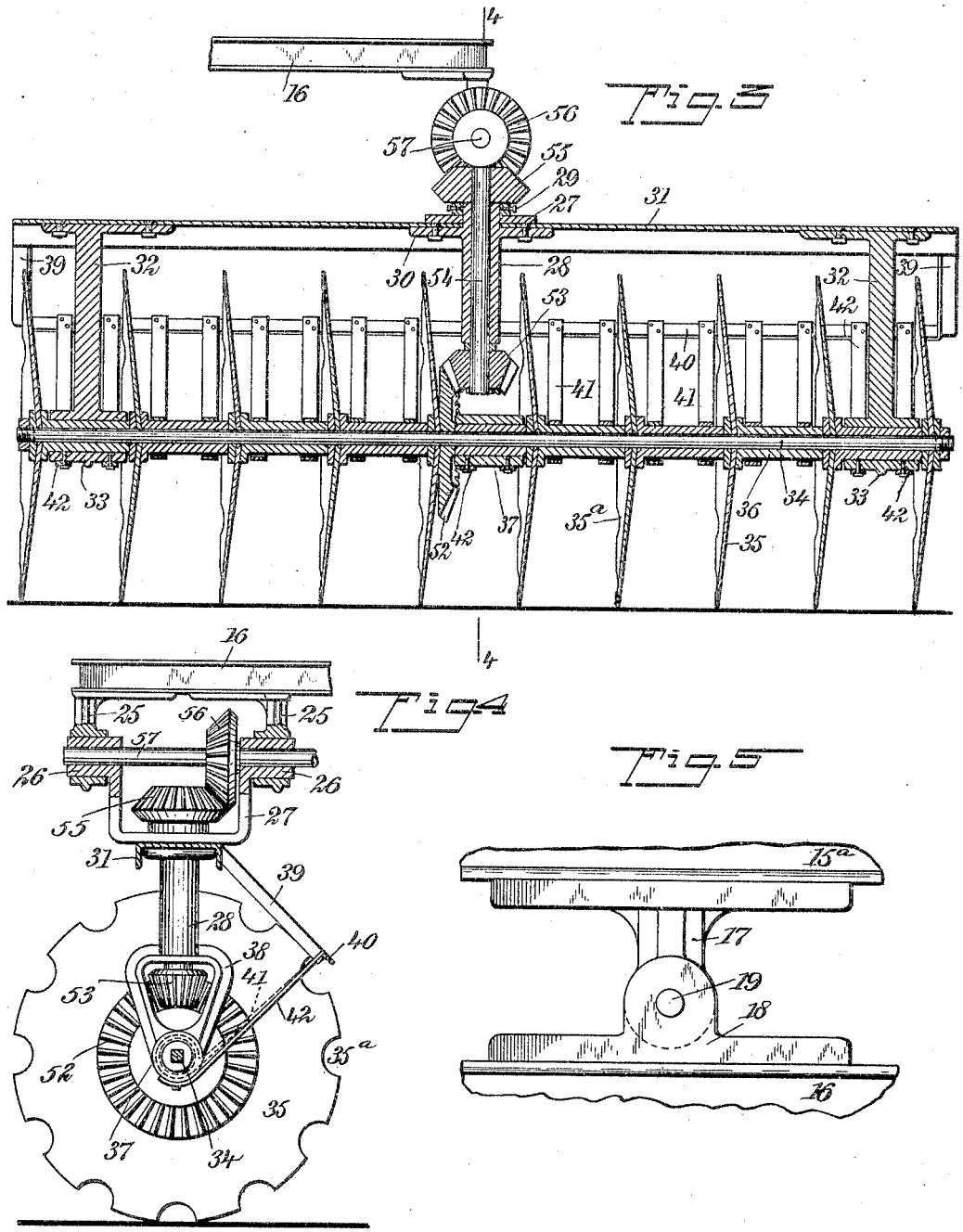

No. 789,528. PATENTED MAY 9, 1905.
A. E. COOK & S. E. KURTZ.
MOTOR DRIVEN AGRICULTURAL APPARATUS.
APPLICATION FILED FEB. 4, 1904.
6 SHEETS—SHEET 4.
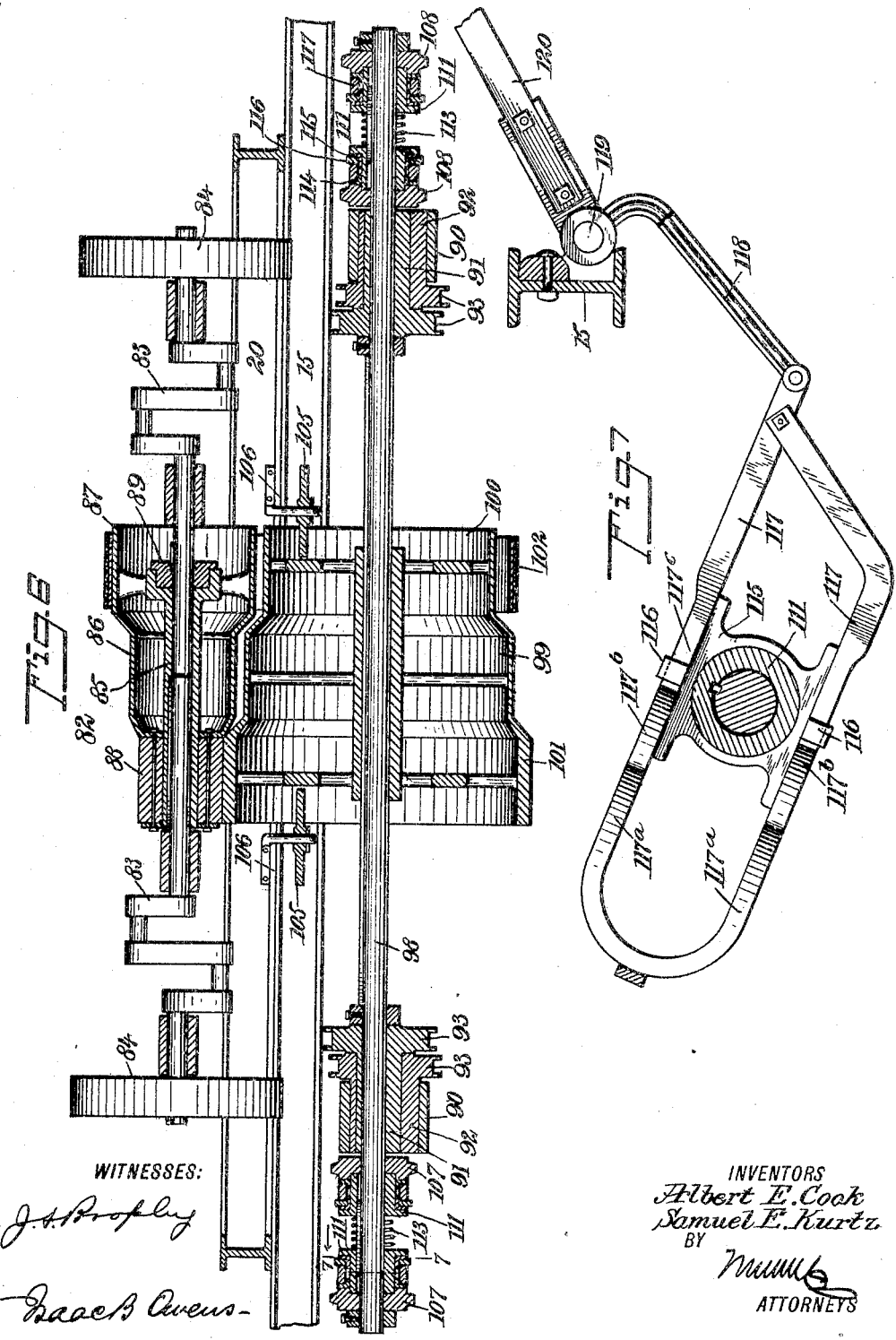
WITNESSES:
INVENTORS
Albert E. Cook
Samuel E. Kurtz
BY
ATTORNEYS No. 789,528. PATENTED MAY 9, 1905.
A. E. COOK & S. E. KURTZ.
MOTOR DRIVEN AGRICULTURAL APPARATUS.
APPLICATION FILED FEB. 4, 1904.
6 SHEETS—SHEET 5.
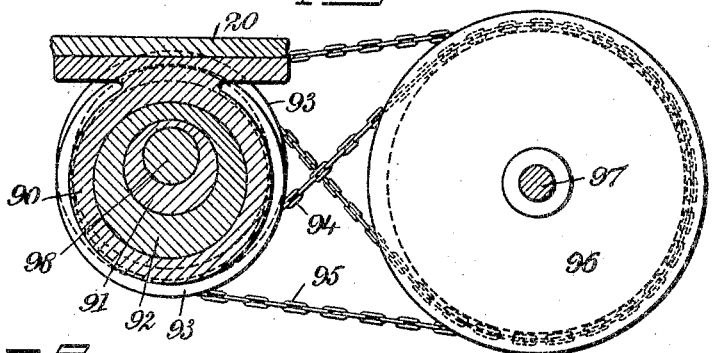
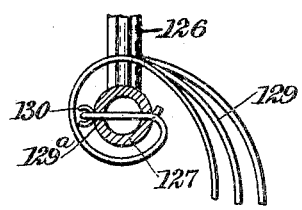
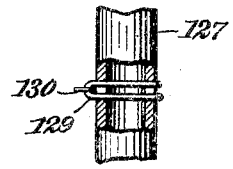
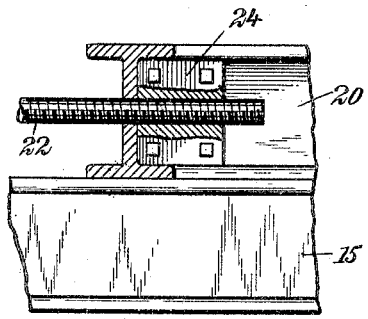
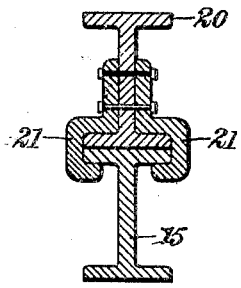
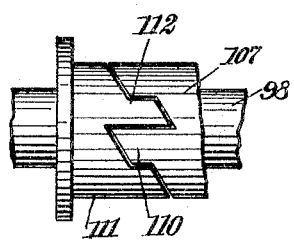
WITNESSES:
J. A. Brophy
Isaac B. Owens
INVENTORS
Albert E. Cook
Samuel E. Kurtz
BY
ATTORNEYS

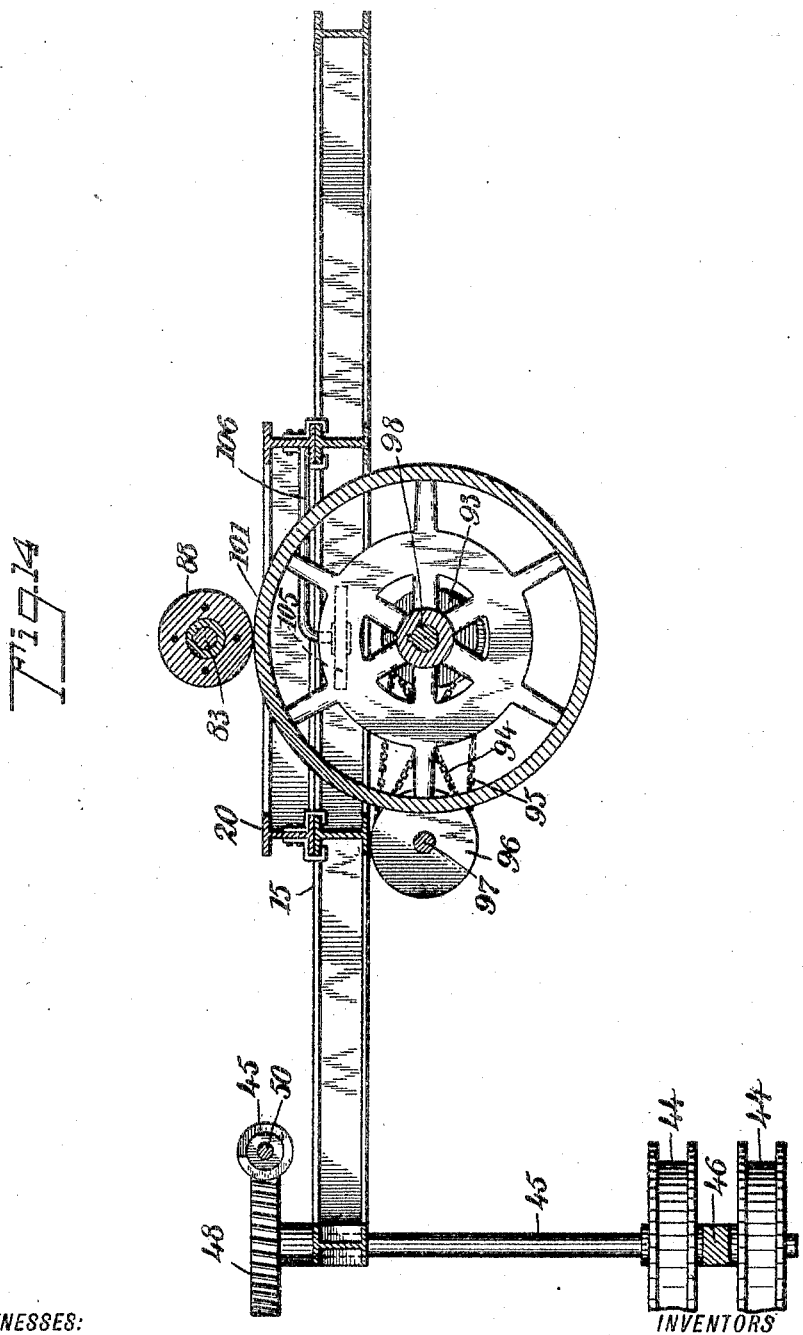

No. 789,528.       Patented May 9, 1905.

UNITED STATES PATENT OFFICE.

ALBERT EUGENE COOK AND SAMUEL ELLSWORTH KURTZ, OF ODEBOLT, IOWA.

MOTOR-DRIVEN AGRICULTURAL APPARATUS.

SPECIFICATION forming part of Letters Patent No. 789,528, dated May 9, 1905.

Application filed February 4, 1904. Serial No. 191,914.

*To all whom it may concern:*

Be it known that we, ALBERT EUGENE COOK and SAMUEL ELLSWORTH KURTZ, citizens of the United States, and residents of Odebolt, in the county of Sac and State of Iowa, have invented a new and Improved Motor-Driven Agricultural Apparatus, of which the following is a full, clear, and exact description.

Our invention relates to a motor-driven agricultural apparatus which may be used for various purposes, such as for plowing, seeding, and cultivating.

The invention involves, primarily, the arrangement of a frame to which the cultivating-tools are attached, these tools bearing directly on the earth and constituting the sole support of the framing and said tools having connection with a suitable source of motive power on the said framing, so that as the tools are driven they act simultaneously to cultivate the earth and to move the apparatus over the surface thereof.

The invention further involves the arrangement of the cultivating-tools in a gang or gangs, so that they may be adjusted independently of their driving movement, whereby to change their angularity to the line along which the apparatus is moving and in this manner to vary their action on the earth and also to steer the apparatus along any desired course, the tools then performing the threefold function of cultivating, driving, and steering.

The invention further involves a novel manner of forming the framing and of mounting the various parts thereon, the leading feature of which arrangement is the provision of a main frame on which a motor-bed is adjustable, so as properly to distribute the weight of the motor, and an auxiliary frame which carries a part of the cultivating-tools and which is arranged to have a certain yielding or rocking movement on the main frame, so as to allow the cultivating-tools mounted on the auxiliary frame to change their position relatively to the main frame, thus relieving the framing of otherwise severe strains.

The invention further involves a novel manner of transmitting the motive power to the various tools, this mechanism effecting such transmission without in any way disturbing the adjustment of the tools, as before described, and involving a means for changing the speed at which the tools are driven and for reversing their movement when desired.

The cultivating-tools above referred to serve to plow the earth, and in connection with these tools we employ at the rear of the machine a transverse gang of spring-teeth mounted on the framing and arranged to rake over the earth, to break up the same, and to act essentially as a harrow, so that by a single operation of the machine the soil can be put in condition to receive the seed, and we equip the apparatus with a seeding mechanism so that this operation may also be performed as the machine passes over the ground.

The invention involves various other novel features concerning the structure and arrangement of its parts, whereby we attain effective and scientifically-correct cultivation of the soil and other important advantages, all of which will be fully set forth hereinafter.

This specification is an exact description of one example of our invention, while the claims define the actual scope thereof.

Reference is to be had to the accompanying drawings, forming a part of this specification, in which similar characters of reference indicate corresponding parts in all the views.

Figure 1 is a plan view of the complete apparatus. Fig. 2 is a side elevation thereof. Fig. 3 is an enlarged section taken along the axis of one of the front gangs of cultivating-tools—for instance, on the line 3 3 of Fig. 1. Fig. 4 is a section on the line 4 4 of Fig. 3. Fig. 5 is an enlarged detail showing one of the brackets for mounting the auxiliary frame on the main frame. Fig. 6 is a section on the line 6 6 of Fig. 1, particularly illustrating the transmission mechanism. Fig. 7 is an enlarged elevation, with parts in section, on the line 7 7 of Fig. 6 and illustrating one of the clutches and operating-cams which are employed to control the transmission of movement. Fig. 8 is a section on the line 8 8 of Fig. 1, showing the mechanism for throwing the transmission mechanism into and out of gear. Fig. 9 is an enlarged detail section on the line 9 9 of Fig. 1, illustrating the manner of mounting the spring harrow-teeth. Fig. 10 is a detail section of the same parts. Fig. 11 is a detail section showing the screw and nut for shifting the engine-bed on the main frame. Fig. 12 is a detail section on the line 12 12 of Fig. 2, showing the jaws for slidably mounting the engine-bed on the main frame. Fig. 13 is a detail view of one of the peculiar clutches illustrated in Figs. 6 and 7; and Fig. 14 is a cross-section of the engine-bed, frame, and immediately-adjacent parts on essentially the line 14 14 of Fig. 1.

The main frame 15 (see Figs. 1 and 2) lies horizontally and has a centrally-located forward extension $15^a$, beneath which is mounted the auxiliary frame 16, through the medium of brackets 17 and 18, pivotally joined by a pin 19, (see Figs. 2 and 5,) thus allowing the auxiliary frame to rock under the main frame around an axis extending along the longitudinal center of the machine. The engine-bed 20 (see Figs. 2 and 6) is mounted on the central portion of the main frame 15 and has jaws 21, (see Fig. 12,) which slidably engage parts of the main frame, so that the engine-bed may be adjusted longitudinally properly to dispose the weight of the engine-bed and of its attachments. This adjustment is effected by means of a screw-shaft 22, (see Figs. 1 and 11,) revolubly mounted on the main frame and having at its rear end a hand-wheel 23 (see Fig. 1) to facilitate its operation, the front end of the screw-shaft operating in a suitable nut 24 (see Fig. 11) on the engine-bed, so that upon the revolution of the shaft 22 the engine-bed may be moved, as described.

According to the embodiment of the invention here illustrated we employ four gangs of cultivating-tools—two at the front and two at the rear of the machine. The two front gangs are mounted under the auxiliary frame 16, and the structure of each front gang is the same. Depending from the auxiliary frame 16 are two pairs of hangers 25, respectively, for the two front gangs of cultivator-tools. Fig. 1 shows the location of these hangers with respect to the auxiliary frame. In each pair of hangers are mounted to rock the sleeves 26 of the yokes 27. Said yokes have fitted therein the vertical tubular stems 28, which are provided with collars 29 and 30, allowing the stems to turn in the yokes, but preventing independent vertical movement of the stems. To the said stems 28 are attached the horizontal beams 31, forming, respectively, the frames of the front gang of cultivating-tools. Depending from the frame-beams 31 are brackets 32, having bearings 33 at their lower ends, which bearings mount the axial shafts 34 of the tools 35. The shaft 34 has thimbles 36 thereon, which space the tools 35 from each other, the parts 34, 35, and 36 turning as a unit. The brackets 32 carry, respectively, the end portions of the shafts 34, and the middle portion of the shaft is supported by a bearing 37, carried by a yoke 38, in turn rigidly supported on the stem 28. As here shown, the tools 35 are in the form of cultivator-disks and have notched peripheries $35^a$ for the double purpose of effectively plowing the earth and of enabling the tools to have a traction action thereon. Attached to the ends of each beam 31 are arms 39, which extend rearward and carry a transverse angle-bar 40, to which are attached scrapers 41, coacting with the tools 35, and the angle-bar 40 is further supported by means of braces 42, attached to the bar and suitably fastened to the bearings 33 and 37. It may thus be seen that each front gang of tools 35 is mounted to swing bodily around a vertical axis—i. e., the longitudinal axis of the stem 28—and to rock bodily independently of the auxiliary frame 16 around a longitudinally-extending horizontal axis—i. e., that of the bushings 26. The latter movement around the horizontal axis is allowed to enable the gangs to accommodate themselves to the unevenness of the ground, and the former movement is provided to enable the angularity of the tools to be changed at will for the purpose of controlling the plowing action and for steering the apparatus. To give the gangs of tools this movement around the vertical axes, we employ chains or equivalent connections 43, attached one to each end of the beams 31 and extending rearward and wound oppositely around drums 44, carried, respectively, on vertical shafts 45, mounted at their upper ends in the main frame 15 and at their lower ends in bearings 46, supported by braces 47, extending downwardly and forwardly from the main frame. Said shafts 45 carry at their upper ends worm-wheels 48, having worms 49 meshed therewith. Said worms 49 are carried, respectively, on shafts 50, arranged to turn on the main frame and having hand-wheels 51 at their rear ends to facilitate the operation of the shafts. In this manner the drums 44 may be turned at will and the front gangs of tools 35 shifted, as described.

The driving movement is imparted to the tools 35 by trains of gearing which will now be described.

Connected securely to each shaft 34 is a miter-gear 52, meshed with a pinion 53, attached to the lower end of a shaft 54. The shafts 54 are revolubly mounted in the tubular stems 28 and carry at their upper ends miter-gears 55, meshed with corresponding gears 56, carried on rotary shafts 57. Said shafts 57 are revolubly mounted on the sleeves 26 of the yokes 27 (see Figs. 2, 3, and 4) and, if desired, may be further braced by other bearings, (see, for example, the brackets 58 at the left-hand side of the auxiliary frame 16 shown in Figs. 1 and 2.) To the rear ends of the shafts 57 sprocket-wheels 59 are fastened, and over said wheels pass chains 60, which extend from the transmission mechanism, as will be hereinafter fully set forth. In this manner the tools 35 may be revolubly driven without in any way interfering with their various movements, as above explained.

The tools 61 of the rear gangs are practically the same as the tools 35, excepting that the peripheries of the tools 61 are continuous. Said tools are mounted on shafts 62, the same as the shafts 34 before described, and are carried by frame-beams 63, the same as the beams 31. Each rear gang is supported by a yoke 64, similar to the yokes 27, and stems, shafts, and gearing similar to the parts 28, 54, 53, and 52 before described. The said yokes 64 have bushings or hollow trunnions rockably mounted in hangers 65, which depend from the main frame 15, and by these means the rear gangs of tools are mounted to turn around vertical axes and to rock around horizontal axes the same as the front gangs, but without the rolling action provided by the auxiliary frame 16 and its connections with the main frame. 67 indicates gears which have the aforesaid driving connection with the rear tools 61, and 68 indicates gears meshed with the gears 67 and carried on revoluble shafts 69, mounted in the hangers 65. Said shafts 69 have sprocket-wheels 70 attached thereto, and over said wheels chains 71 run, these chains having connection with the transmission mechanism to be fully set forth hereinafter. The rear gangs of tools are intended to be shifted to adjust their angularity the same as the front gangs, and this is effected by attaching chains or other equivalent connections 72 to the respective ends of the beams 63, these chains being led forward and passed around drums 73, attached to the shafts 45, the arrangement of the drums 44 and 73 and the chains 43 and 72 being such that the front gangs of tools are shifted in unison with the rear gangs and the parts are also maintained in a fixed relative position.

Scraping devices 74 are employed for the rear tools the same essentially as the scrapers for the front tools. We also provide moldboards 75 for each of the rear tools 61, these moldboards lying alongside of their respective disk-tools 61, so as to turn the earth as it is plowed by these tools, thus giving the apparatus the action of a plow simultaneously with the pulverizing action which is effected by the cultivator-tools 35 and also with the harrowing action of devices which will be hereinafter specifically referred to. The said moldboards 75 may be supported in any desired manner, but preferably by means of arms 76, adjustably fastened in forks 77 by means of pins capable of being fitted in any one of a plurality of holes in the forks. (See Fig. 1) The forks project rearward from the frame-beams 63. The parts 76 and 77 are thus adjustably connected to allow the moldboards to be placed in any desired position. We also provide a seeding mechanism which is used in connection with the rear gangs of tools 61. This mechanism may be of any type desired, and, as here shown, it comprises seedboxes 78, suitably fastened, respectively, to the frame-beams 63, the feeding mechanism thereof being driven by sprocket-wheels 79 and chains 80, passing from the shafts 62. The drill-spouts 81 are removable and project from the seedboxes in the usual manner and lie, respectively, alongside of the disks 61, so as to deposit the seed in the furrows opened by these disks. By removing the drill-spouts and properly adjusting the seeding device the apparatus may be made to sow broadcast.

From the foregoing it will appear that the power necessary for driving the apparatus to perform its various functions is applied to the chains 60 and 71, and we will now describe the mechanism for transmitting and controlling such power.

In the type of the invention here illustrated we employ two engines 82, suitably mounted on the bed 20 and each being preferably of the two-cylinder horizontal gasolene-fuel type. In Fig. 6 the crank-shafts 83 of these engines are illustrated, said shafts being separate from each other and provided each with a fly-wheel 84, as shown. Keyed to one of the crank-shafts, preferably the forward shaft, is the hub 85 of a combined two-faced pulley 86 87 and friction-gear 88. The rear crank-shaft is fitted loosely in the rear portion of said hub 85 and may be connected therewith at will by means of a clutch member 89, splined on the rear crank-shaft and coacting with a corresponding member formed on the rear end of said hub 85. By this arrangement the front end is permanently coupled to the pulleys 86 87 and the friction-gear 88, and the rear engine may be connected or disconnected at will. This enables us to run one or both engines, as desired.

Projecting from the main frame 15 and alined longitudinally with the machine are hangers 90. (See Figs. 6 and 8.) In each hanger are mounted two eccentrics 91 and 92, arranged one within the other, as shown, and each carrying a wheel 93, with which are engaged, respectively, the crossed chains 94 and uncrossed chains 95. Said chains are engaged also with large double-faced driving-wheels 96, mounted on a revoluble shaft 97, suitably sustained on the main frame 15, as shown in Fig. 2, so that by turning the wheels 96 the eccentrics 91 and 92 will be turned oppositely, as will be readily understood. The shaft 97 extends to the rear part of the main frame and is provided with an operating-lever 109, as shown. The inner eccentrics 91 carry the revoluble counter-shaft 98, these eccentrics constituting the bearings for said shaft, and it will be seen that as the eccentrics are operated, as before explained, the counter-shaft 98 will be moved toward and from the crank-shafts 83. Owing to the double eccentrics and the arrangement for turning them oppositely, the counter-shaft will be moved in a straight line radially toward and from the engine crank-shafts 83 as contradistinguished from being moved in a curved line, as would result from the use of a single eccentric. Splined on the said counter-shaft 98 is a combined double-faced pulley 99 100 and a friction-gear 101, the friction-gear coacting with the friction-gear 88 on the crank-shafts 83 and the faces 99 and 100 of the double-faced pulley corresponding, respectively, with the faces 86 and 87 of the double-faced pulley on the crank-shaft. The gears 88 and 101 engage directly with each other, and in connection with the double-faced pulleys we employ a heavy belt 102. This belt may be of any desired form, but is preferably constructed of a combination of rubber, canvas, covering woven wire. Said belt may be shifted from one set of faces to the other by means of a shifting-rod 103, (see Fig. 1,) having fingers 104 engaging opposite edges of the belt and the rod extending rearward into position to be conveniently operated by the driver of the machine. It has been before explained that the engine-bed 20 is shiftable on the main frame 15, and to allow this shifting movement the elements 101, 99, and 100 are free to slide on the counter-shaft 98, corresponding to the sliding movement of the engine-bed, and in order to impart this sliding movement to said elements antifriction-disks 105 105 are engaged with the respective sides of the elements 101, 99, and 100, and said disks are carried by brackets 106, attached to the engine-bed. Now it will be clear that by operating the eccentrics 91 and 92 the elements 88 and 101 may be engaged or disengaged at will, and upon the engagement of these gears the cultivator or plowing-tools 35 and 61 are driven reversely. By moving the counter-shaft 98 away from the crank-shaft the belt 102 is tightened between the double-faced pulleys 86 87 and 99 100, and owing to the ratio between the faces of these pulleys the counter-shaft may be driven at either one of the two speeds, according to the position of the belt 102. This will drive the cultivator-tools in the forward direction at either of two speeds.

The chains 60, respectively, pass over sprocket-wheels 107 on the front end of the counter-shaft 98, and the chains 71, respectively, pass over sprocket-wheels 108 on the rear end of the counter-shaft. We provide certain peculiar clutch mechanism for rendering these sprocket-wheels fast or loose on the counter-shaft and for enabling the chains 60 and 71 to run ahead of the motor, as will occur when the apparatus is turning and under other extreme conditions of usage.

The sprocket-wheels 107 and 108 are formed with clutch-teeth 110, (see Fig. 13,) which have longitudinal faces and diagonal ends, and coacting with these parts of the sprocket-wheels are the respective clutch members 111 having correspondingly-formed clutch-teeth 112. The clutch members 111 are splined on the counter-shaft 98, and it will be observed in connection with these parts that when the clutch members are completely engaged with the sprocket-wheels said members will transmit movement to the sprocket-wheels in either direction. When the clutch members are partly engaged with the sprocket-wheels—*i.e.*, engaged at one of the longitudinal faces of the clutch-teeth only—the clutch members will transmit movement to the sprocket-wheels in one direction and the sprocket-wheels will be allowed to run ahead of the clutch members, and upon the complete disengagement of the clutch members from the sprocket-wheels no movement at all will be transmitted. We so adjust the parts that when the cultivator-tools are driven ahead the clutch members will be partly engaged with the sprocket-wheels, and when the cultivator-tools are being driven backward the clutch members will be fully engaged with the sprocket-wheels. Said clutch members are pressed into active position by means of springs 113, which are one for each pair of clutch members and, acting between them, tend to keep the clutch members normally in active position. Said clutch members have flanges at their outer ends, and encircling the flanges are two collars 114 and 115, the latter having lugs 116, as shown. The clutch members are revoluble within the collars, and, as shown in Fig. 7, said collars are formed with parallel faces and are fitted slidably between the parallel limbs 117 of the actuating-cam, so that said actuating-cam may slide on the collars and the clutch members 111 will be free to revolve within the same. The two limbs of the cams 117 are formed with three stages, (designated $117^a$, $117^b$, and $117^c$, respectively,) these stages of the cams engaging the lugs 116 and serving to move the collars 115 away from their respective sprocket-wheels 107 or 108. When the stage $117^a$ is engaged with the lugs 116, the clutch members are fully engaged with the sprocket-wheels, and when the stage $117^b$ is engaged with the lugs 116 the clutch members will be partly engaged, and when the stages $117^c$ are engaged with the lugs 116 the clutch members will be fully disengaged. The cams 117 are connected to arms 118, which rock on centers 119, suitably fastened to the main frame of the machine, and said arms 118 have connection with operating means 120 by which the various adjustments of the cams may be brought about.

121 indicates the driver's seat, which is located at the rear part of the main frame 15, and the various operating devices 51, 23, 109, 103, and 120 are extended rearward into proximity to the seat, so that the machine may be controlled conveniently. Formed on the rear portion of the main frame 15 is a sight 122, which lies in the longitudinal center of the machine and is adapted to be used in connection with the front sight 123 to enable the machine to be accurately steered. At each side of the front sight 123 are a series of side sights 124, intended to be used to steer the machine on any predetermined curve.

125 indicates a suitable lantern which provides light for the apparatus when working at night.

As shown in Fig. 2, hangers 126 are attached to the rear extremity of the main frame 15 and carry a horizontal transverse tube 127. To this tube 127 spring harrow-teeth 129 are attached. These teeth are in the form of spring-rods and have their fixed ends formed with loops $129^a$, passed through the part 127 and locked by a suitable key or cotter 130. The upper portions of the spring fingers or teeth 129 are coiled once or a plurality of times, if desired, around the shaft 127, and in this manner the greatest elasticity is attained. To each end of the shaft or rod 127 extensions 128 are secured, which in turn carry broad marking-teeth 131, and at the middle of the tube 127 a marker 132 is located. This tooth may be made in shovel form, as shown, and will then serve also to break the ground between the two gangs of cultivating-tools at each side of the machine. The marking-teeth 131 may be arranged at any desired distance from the sides of the machine according to the length of the rods or tubes 128. (See broken lines in Fig. 1.) The part 127 is arranged to rock in the hangers 126, and for this purpose we provide a hand-lever and quadrant 133, which enables the teeth to be raised clear of the ground or to be engaged therewith to any desired depth. It may be seen from Figs. 1 and 2 that the teeth 129 are arranged in three groups, one ahead of the other, and in this manner we insure thoroughly breaking up, harrowing, and preparing the soil for the growth of the seed.

In the practical operation of the apparatus one or both of the motors is started, as may be desired, and the transmission and clutch mechanism is adjusted to drive the elements 35 and 61 ahead. These elements acting on the ground thoroughly plow and pulverize the same and simultaneously draw the apparatus over the field. The harrow-teeth 129 following the plowing and cultivating devices complete the work of preparing the soil for the growth of the seed. By adjusting the angularity of the tools 35 and 61 the effect of the tools on the soil may be controlled, and also the apparatus may be turned to one side or the other, as desired. In the work of steering the apparatus the sights 122, 123, and 124 may be used, and through their means an absolutely accurate course may be followed. The seed-planting mechanism may be employed or not, as desired.

In connection with the apparatus it will be observed that it may not only be used for plowing the earth and planting the seed, but also it may be employed for cultivating a crop upon the growth thereof, this being effected by removing the proper seeding, cultivating, plowing, or harrowing tools or devices, so as to provide spaces for the rows of the crop, thus enabling the machine to straddle one or several of the same. The teeth 129 are particularly useful in cultivating corn when they act to follow the plowing or cultivating tools and fully harrow the ground. Owing to the extreme elasticity of the teeth 129, they will not injure the corn by striking and bruising the same. In connection with the notched disk tools 35 it will appear that by these means the dead vegetation on the ground may be effectually cut and the plowing operation thereby rendered easy.

The apparatus may be employed advantageously to perform a large number of agricultural operations, and since this will be sufficiently appreciated by agriculturists it is not necessary for us to directly refer to them.

Various changes in the form, proportions, and minor details of our invention may be resorted to at will without departing from the spirit and scope thereof. Hence we consider that we are entitled to all such variations as may lie within the intent of our claims.

Having thus described our invention, we claim as new and desire to secure by Letters Patent—

1. The combination of a main frame, an engine-bed adjustable thereon, an engine mounted on the engine-bed, an auxiliary frame movably mounted on the main frame, a cultivating-tool adjustably mounted on the auxiliary frame, and means for driving the cultivating-tool from the engine.

2. An agricultural apparatus, comprising a frame, a cultivating-tool, an engine-bed adjustable on the frame, an engine carried by the engine-bed, and means for driving the tool from the engine.

3. In an agricultural apparatus, the combination of a frame, a yoke, means for mounting the yoke to swing on the frame, a beam attached to said yoke, a gang of rotary cultivating-tools, a shaft on which the tools are mounted, means connecting the shaft with the beam, said means including a tubular member, and means for driving the tools, said means comprising elements extending through the axis of the swinging movement of the yoke and through said tubular member whereby to drive the tools independently of the rocking movement of the yoke on the frame.

4. The combination of a main frame, an auxiliary frame mounted to rock thereon around a longitudinal axis, a tool-frame mounted to swing and to turn on the auxiliary frame, and a tool carried by the tool-frame.

5. The combination of a main frame, an auxiliary frame mounted to rock thereon around a longitudinal axis, a tool-frame mounted to swing and to turn on the auxiliary frame, a tool carried by the tool-frame, and means for driving the tool without interfering with said movement of the auxiliary frame and tool-frame.

6. A motor-driven agricultural apparatus, comprising a main frame, means for mounting and driving the same, a motor-bed longitudinally adjustable on the main frame, and a motor mounted on the bed.

7. In a motor-driven agricultural apparatus, the combination of a frame, a plurality of gangs of combined cultivating and propelling tools on which the frame is mounted and by which the frame is wholly supported, said gangs of cultivating-tools being arranged diagonal to the line of movement of the cultivating apparatus, and a source of motive power mounted on the frame and connected with said tools to operate them, whereby simultaneously to cultivate the earth and propel the apparatus over the surface thereof.

8. In a motor-driven agricultural apparatus, the combination of a frame, a plurality of gangs of rotary combined cultivating and propelling tools, said gangs being disposed diagonally of the line of movement of the apparatus, the said frame being mounted on and wholly sustained by said tools, and means on the frame for revolubly driving said tools whereby to cultivate the ground and simultaneously propel the apparatus over the surface thereof.

9. In a motor-driven agricultural apparatus, the combination of a frame, a plurality of combined cultivating and propelling tools on which the frame is mounted and by which the frame is wholly sustained, said tools being adjustable to change their inclination to the line of movement of the apparatus, a source of motive power mounted on the frame and connected with the tools to drive the same whereby to cultivate the earth and simultaneously to propel the apparatus over the surface thereof, and means for adjusting the tools to change their inclination to the line of movement of the apparatus whereby to direct or steer the apparatus.

10. In a motor-driven agricultural apparatus, the combination of a frame, a plurality of gangs of cultivating-tools on which the frame is mounted and by which the frame is wholly sustained, said gangs of tools being adjustable around a vertical axis to change their inclination to the line of movement of the apparatus, means for so adjusting the tools, and means for driving the tools to cause them simultaneously to cultivate the earth and to propel the apparatus over the surface thereof.

11. In a motor-driven agricultural apparatus, the combination of a frame, a plurality of gangs of revoluble combined cultivating and propelling tools, on which gangs of tools the frame is mounted and by which the frame is wholly sustained, said gangs of tools being adjustable around a vertical axis to vary their inclination to the line of movement of the apparatus, means mounted on the frame for revolubly driving the tools to cultivate the earth and simultaneously to propel the apparatus over the surface thereof, and means for adjusting the gangs of tools whereby to steer the apparatus.

12. In a motor-driven agricultural apparatus, the combination of a main frame, an auxiliary frame, means for mounting the main frame on the auxiliary frame, said means permitting a rocking movement of the auxiliary frame independently of the main frame, a cultivating-tool, and means for mounting the cultivating-tool under the auxiliary frame, said means permitting a rocking movement of the said tool independently of said auxiliary frame.

13. In a motor-driven agricultural apparatus, the combination of a main frame, an auxiliary frame, means for mounting the main frame on the auxiliary frame, said means permitting a rocking movement of the auxiliary frame independently of the main frame, a cultivating-tool, means for mounting the cultivating-tool under the auxiliary frame, said means permitting a rocking movement of the said tool independently of said auxiliary frame, and means for driving said tool, the last-named means comprising an element axially coincident to the axis of the said rocking movement of the tool.

14. In an agricultural apparatus, the combination of a main frame, an auxiliary frame located under the same, means connecting the main and auxiliary frames, said means permitting independent rocking movement of the auxiliary frame around an axis essentially central of the apparatus, a cultivating-tool located at each side of the auxiliary frame, and means for connecting the cultivating-tools to the auxiliary frame, said means permitting independent rocking movement of the tools.

15. In an agricultural apparatus, the combination of a main frame, an auxiliary frame located under the same, means connecting the main and auxiliary frames, said means permitting independent rocking movement of the auxiliary frame around an axis essentially central of the apparatus, a cultivating-tool located at each side of the auxiliary frame, means for connecting the cultivating-tools to the auxiliary frame, said means permitting independent rocking movement of the tools, and means for driving the cultivating-tools, the last-named means comprising elements coincident to the axes of the rocking movements of the cultivating-tools.

16. In a motor-driven agricultural apparatus, the combination of a main frame, an engine sustained thereon, an auxiliary frame located under the main frame, means connecting the auxiliary frame with the main frame, said means permitting independent rocking movement of the frames around an axis longitudinal of the machine, a tool, means connecting the same with the auxiliary frame, and gearing for driving the tool from the engine.

17. In a motor-driven agricultural apparatus, the combination of a frame, an engine mounted thereon, an auxiliary frame, means connecting the main and auxiliary frames to allow independent rocking movement of the auxiliary frame, a cultivating-tool, means connecting the cultivating-tool with the auxiliary frame, said means permitting independent rocking movement of the tool, and gearing for driving the tool from said engine, said gearing comprising an element coincident to the rocking movement of the tool.

18. In a motor-driven agricultural apparatus, the combination of a main frame, an engine mounted thereon, an auxiliary frame, means connecting the main and auxiliary frames, and means permitting independent rocking movement of the auxiliary frame around an axis essentially central of the machine, cultivating-tools located at each side of said center of rocking movement of the auxiliary frame, means connecting the cultivating-tools with the auxiliary frame, and gearing for driving the cultivating-tools from said engine.

19. In a motor-driven agricultural apparatus, the combination of a main frame, an engine mounted thereon, an auxiliary frame, means connecting the main and auxiliary frames to permit independent rocking movement of the auxiliary frame around an axis essentially longitudinal of the apparatus, a cultivating-tool at each side of said axis, means for connecting the cultivating-tools with the auxiliary frame to permit rocking movement of said tools, and gearing connecting said tools with the engine to drive the two, the gearing including elements coincident to the axis of the rocking movements of the tools.

20. In a motor-driven agricultural apparatus, the combination of a main frame, an engine, means for mounting the engine adjustably on the main frame, a cultivating-tool, means for mounting the cultivating-tool on the apparatus, and gearing for driving said tool from said engine, said gearing including sliding parts to admit of said adjustment of the engine.

21. In a motor-driven agricultural apparatus, the combination of a frame, an engine, an engine-bed, means for slidably mounting said bed on said frame, a cultivating-tool, means for connecting the tool with the frame, and gearing for driving the tool from the engine, said gearing including sliding parts to admit of the said adjustment of the engine and bed.

22. In a motor-driven agricultural apparatus, the combination of a frame, an engine, means for adjustably mounting the same on the frame, a cultivating-tool, means connecting the tool with the frame, a drive-shaft, means establishing a sliding connection between the engine and drive-shaft to admit of the said adjustment of the engine, and gearing connecting the drive-shaft with the cultivating-tool to drive said tool.

23. In an agricultural apparatus, the combination of a main frame, two cultivating-tools respectively at the sides thereof, means for rockably mounting said tools on the main frame, an auxiliary frame, means for connecting the main frame with the auxiliary frame to allow independent rocking movement of the auxiliary frame, a cultivating-tool at each side of the auxiliary frame, and means connecting the last-named cultivating-tools with the auxiliary frame.

24. In an agricultural apparatus, the combination of a main frame, a cultivating-tool at each side thereof, means connecting the cultivating-tools with the main frame to permit the tools to rock on the said frame, an auxiliary frame, means connecting the auxiliary frame with the main frame, said means permitting independent rocking movement of the auxiliary frame, a cultivating-tool at each side of the auxiliary frame, and means for connecting the last-named cultivating-tools with the auxiliary frame, said means permitting independent rocking movement of said tools.

25. In a motor-driven agricultural apparatus, the combination of a main frame, a cultivating-tool at each side thereof, means for mounting said tools on the main frame, an auxiliary frame, means for connecting the auxiliary and main frames, said means permitting the independent rocking movement of the auxiliary frame, a cultivating-tool at each side of the auxiliary frame, means connecting the last-named cultivating-tools with the auxiliary frame, an engine mounted on the main frame, and means for driving all of said tools from said engine.

26. In a motor-driven agricultural apparatus, the combination of a main frame, an engine, means for mounting the engine on the frame, a cultivating-tool at each side of the main frame, means for connecting the cultivating-tools with the main frame, said means permitting independent rocking movement of the cultivating-tools, an auxiliary frame, means connecting the main and auxiliary frames, said means comprising independent rocking movement of the auxiliary frame, a cultivating-tool at each side of the auxiliary frame, means for mounting the cultivating-tools to rock on the auxiliary frame, and gearing for driving all of the said tools from said engine, said gearing including elements coincident to the centers of the rocking movement of all of said tools.

27. In a motor-driven agricultural apparatus, the combination of a frame, a plurality of cultivating-tools whereon said frame is mounted, an engine, an engine-bed adjustably mounted on the frame whereby to adjust the position of the engine, and gearing connecting said engine with all of said tools to drive the tools from the engine, said gearing including sliding elements to admit of said adjustment of the engine.

28. In an agricultural apparatus, the combination of a frame, two gangs of cultivating-tools mounted thereon to swing around vertical axes intermediate the ends of said gangs, drums mounted on the frame, means for operating the drums, and flexible connections between the ends of said gangs of tools and said drums simultaneously to adjust the inclination of said gangs of tools.

29. In an agricultural apparatus, the combination of a frame, a hanger depending therefrom, a yoke having a tubular part arranged to turn in the hanger, a beam attached to said yoke, a gang of rotary cultivating-tools, means connecting said tools with said beam to mount the tools, said means comprising a tubular member, and means for driving the tools, said means comprising elements extending through said tubular part of the yoke and through the said tubular member whereby to drive the tools independently of the rocking movement of the yoke on the hanger.

30. In a motor-driven agricultural apparatus, the combination of a frame, a plurality of combined cultivating and propelling tools on which the frame is mounted, and by which the frame is wholly supported, said cultivating-tools being arranged diagonally to the line of movement of the cultivating apparatus and oppositely to each other, and a source of motive power mounted on the frame and connected with the tools to operate them whereby to simultaneously cultivate the earth and propel the apparatus over the surface thereof.

31. In a motor-driven agricultural apparatus, the combination of a frame, a plurality of combined cultivating and propelling tools on which the frame is mounted, and by which the frame is wholly supported, said cultivating-tools being arranged diagonally to the line of movement of the cultivating apparatus and oppositely to each other, a source of motive power mounted on the frame and connected with the tools to operate them whereby to simultaneously cultivate the earth and propel the apparatus over the surface thereof, and means for adjusting the tools to change their inclination to the line of movement of the apparatus whereby to direct or steer the apparatus.

In testimony whereof we have signed our names to this specification in the presence of two subscribing witnesses.

ALBERT EUGENE COOK.
    SAMUEL ELLSWORTH KURTZ.

Witnesses:
 R. W. SAYRE,
 A. E. BAKER.